INVENTOR.
REINHARD H. PAULUS

INVENTOR.
REINHARD H. PAULUS
BY

United States Patent Office 3,364,414
Patented Jan. 16, 1968

3,364,414
SATURABLE CORE FREQUENCY DOUBLER
THREE-PHASE POWER MODULATOR
Reinhard H. Paulus, Milwaukee, Wis., assignor to Allen-Bradley Company, Milwaukee, Wis., a corporation of Wisconsin
Filed Apr. 30, 1965, Ser. No. 452,050
7 Claims. (Cl. 321—68)

ABSTRACT OF THE DISCLOSURE

A power modulator for the control of a three phase induction motor has a pair of saturable reactors per phase. Each pair of reactors has two cores, aiding primary windings connected to the line, opposing control windings connected to the d-c control source, and opposing secondary windings connected to the motor stator. The primary and secondary windings may be connected in Y or delta, and the control windings are connected in series. A reversible control employs additional pairs of saturable reactors for two phases with oppositely conducting diodes in series with the respective control windings of the two.

---

The present invention in general relates to a magnetic frequency multiplying power modulator. More specifically the invention relates to a power modulator adapted to receive electrical power from a three-phase input power source and deliver three-phase output power at a frequency twice the frequency of the input power and which output power may be varied in magnitude according to a direct current control signal.

Three-phase power modulators have wide use in regulating power supplied to adjustable speed induction motors. The speed and the shaft power of an induction motor is dependent on the frequency and magnitude of the electrical power delivered to the stator windings of the motor. The speed is generally controlled by controlling the output of the power modulator in accordance with a control signal. The control signal may be a function of the difference between the actual and desired motor speed. Also, since frequency is an important factor, by incorporating a frequency multiplying power modulator in high speed induction motor control systems, the physical size of the motor can be smaller than would otherwise be necessary for the same speed and shaft power or if the same motor were used, the speed range and shaft power would be increased. For example, if the frequency is doubled, the maximum speed and the shaft power are nearly doubled.

The power modulator of the present invention in its broader aspects includes a plurality of magnetic saturable reactors each carrying an input, output and control winding. The input and output windings are connected as three-phase windings in a Y-delta arrangement. For purposes of this discussion, Y-delta will be understood to mean that the windings are either Y-connected or delta-connected. In the present power modulator, the input windings are adapted to receive a standard three-phase input power. The output windings are adapted to deliver a three-phase power which is predominantly the second harmonic of the input. Each leg of the three-phase windings has two reactor elements of a magnetic material with sharply saturating characteristics. The control windings associated with the reactor elements are connected in series with the two control windings of each leg being of opposite polarity. Thus a direct current control signal passing through the control windings pre-magnetize or bias the reactors of each leg in opposite directions. Each phase of the input power is applied across the three-phase input windings such that the frequency doubling circuits depend upon driving each core of each leg into and out of saturation once each cycle with each core being driven out of saturation on alternate half cycles. The duration of the unsaturated period is dependent upon the magnitude of the control signal. The control current acts as a bias current for each reactor and by controlling the bias, the magnitude of the output voltage and rotational speed of the motor are controlled. The secondary windings deliver the frequency-multiplied power to the input terminals of the device to be driven which in the illustrated embodiment is an induction motor.

The rotational direction of the motor is dependent upon the phase relationship of the voltage applied to the stator windings. For example, if the phase relationship is phase A, B and C the motor rotates in the opposite direction than when the phase relationship is C, B and A. Accordingly, a power modulator which produces a three-phase output which is always of the same phase relationship may be classified as a unidirectional power modulator. One in which the phase relationship is controlled in either direction may be classified as a bidirectional power modulator. The invention, teaches that by incorporating four additional reactors, or a total of ten reactors, each with an associated input, output and control winding, a bidirectional power modulator may be realized. The reactors are arranged such that for both directions one leg or two reactors are common and depending on the desired direction, four of the remaining eight cores are employed to accompany the common leg. The desired direction is sensed by the polarity of the direct current control current such that when the control current is positive, two of the three legs of the bidirectional system differ than when the control current is negative.

There are other available magnetic frequency-multiplying power modulators. These modulators generally require complex winding and reactor arrangements. They utilize a principle wherein the phase relationship of the voltages on the primary windings are changed from the standard 120 degrees thereby requiring reactors of various physical characteristics and complex winding arrangements. The cost and size of such units are considerably greater than for the present structure.

Accordingly, it is an object of the present invention to provide an improved three phase, frequency-multiplying, static-magnetic power modulator.

Another object is to provide an improved three-phase frequency multiplying power modulator which may be adapted in a unidirectional or bidirectional motor control system.

The foregoing objects, principles, and further objects and principles will appear in the description to follow. In the description reference is made to the accompanying drawings which form a part hereof and in which there is shown by way of illustration specific embodiments of this invention. These embodiments will be described in sufficient detail to enable those skilled in the art to practice this invention. But it is to be understood that there are numerous other embodiments and uses of this invention and that changes may be made in the body of the invention without deviation from the principles of the invention. Consequently, the following detailed description is not to be taken in a limiting sense; instead the scope of the present invention is best defined by the appended claims.

In the drawings:

FIG. 1 illustrates an induction motor speed control system incorporating an embodiment of a power modulator as taught by this invention. The power modulator is shown with the three-phase connections comprising delta-connected input windings and delta-connected output windings.

FIGS. 2 through 2g inclusive illustrate the phase and frequency relationship of the electrical signals on the input and output windings, and "ideal" magnetization curves for a set of reactors.

Figure 1:
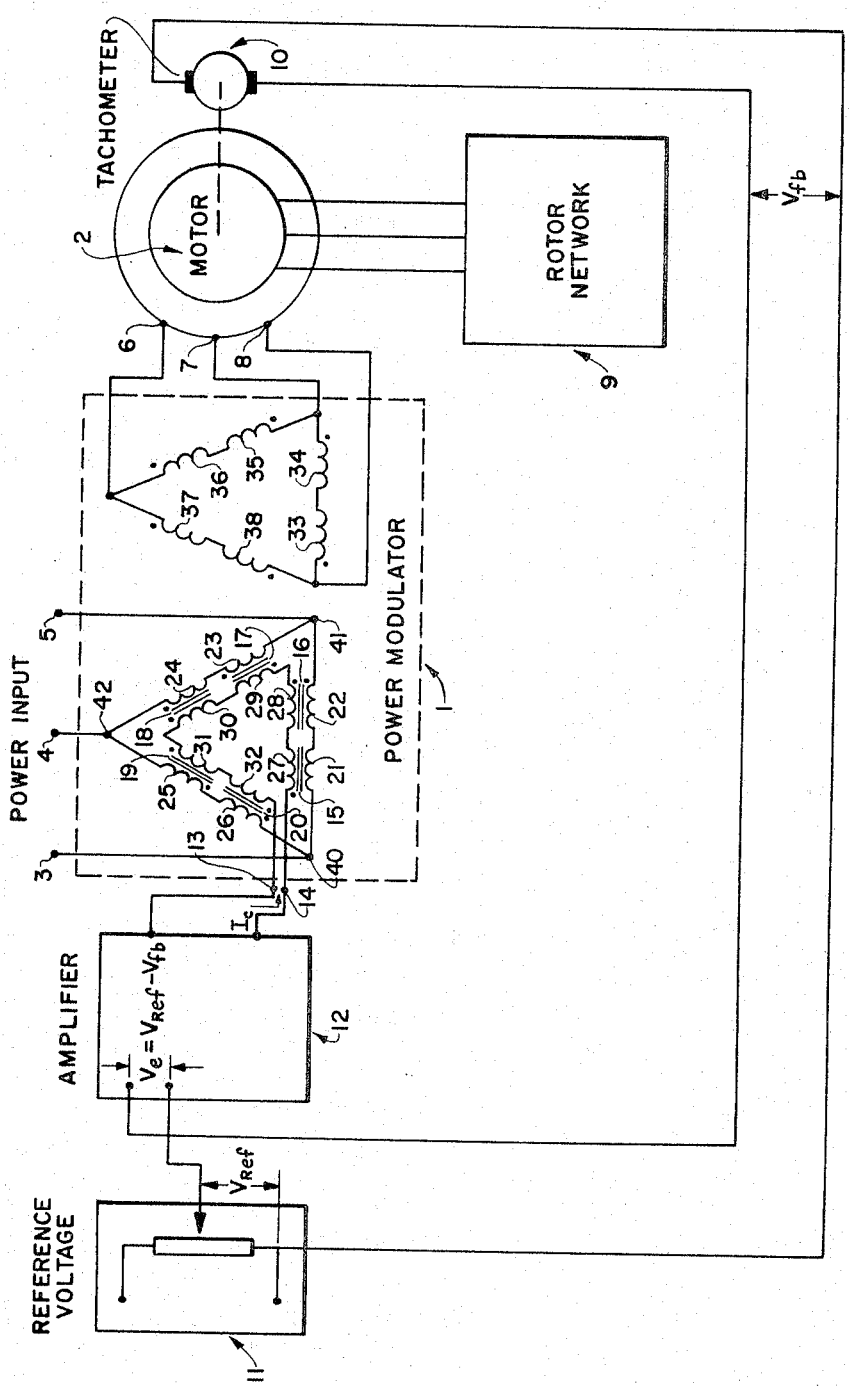

Referring now to FIG. 1, there is shown in block diagram form an induction motor unidirectional speed control system incorporating a unidirectional power modulator as taught by this invention. Disregarding the internal make-up of the block diagrams, including the power modulator, the operation of the system can be briefly described in the following manner. A power modulator, represented by the general reference character 1, is connected between a motor, represented by the general reference character 2, and a three-phase electrical power input source represented by the terminals 3, 4 and 5. The source across the terminals 3, 4 and 5 may be a standard 60 c.p.s. three-phase source. The power modulator 1 receives power from the terminals 3, 4 and 5, and in turn, delivers a controlled 120 c.p.s. power to the motor 2. The motor 2 receives the power at its stator windings represented by a set of terminals 6, 7 and 8. Across the rotor of the motor 2 is a rotor network 9 which network in conjunction with the power modulator 1 controls the motor torque.

The magnitude of the voltage delivered by the power modulator 1 to the stator winding terminals 6, 7 and 8 controls the speed of the motor 1. Control over the magnitude of the voltage is accomplished in the following manner. The actual speed of the motor 1 is sensed by a tachometer, represented by the general reference character 10. The tachometer 10 generates a voltage $V_{fb}$ representative of the actual speed. The voltage $V_{fb}$ is compared with a reference voltage $V_{ref}$, provided by a voltage reference source represented by the general reference character 11. The reference voltage $V_{ref}$ is preset to a value proportional to the desired speed of the motor 2. The voltages $V_{ref}$ and $V_{fb}$ are compared. The difference $V_e$ serves as an error signal proportional to the difference between the desired and actual speed of the motor 2. The error signal $V_e$ is amplified by an amplifier, represented by the general reference character 12. The amplifier 12 provides a direct current control current $I_c$ received across a pair of input terminals 13 and 14 of the power modulator 1. For purposes of explanation, the control current $I_c$ will be defined as positive when it flows from the terminal 14 to the terminal 13 and negative when it flows from the terminal 13 to the terminal 14. The control current $I_c$ serves as a bias for the magnetic power modulator 1 and controls the voltage delivered to the stator winding terminals 6, 7 and 8.

The power modulator 1, as illustrated in FIG. 1, is a unidirectional power modulator. The modulator includes a set of six magnetic saturable reactor cores 15–20. Each reactor carries an input winding 21–26, respectively, a control winding 27–32, respectively, and an output winding 33–38, respectively. To avoid overcrowding the drawing, the output windings 33–38 are redrawn to the right of the input windings 21–26 and control windings 27–32. The input windings 21–26 are delta-connected with the windings 21 and 26 forming a junction 40, the windings 22 and 23 a junction 41, and the windings 24 and 25 a junction 42. The control windings 27–32 are connected in series such that there is a complete series circuit between the control windings and the input terminals 13 and 14.

A three-phase electrical power source is received between the terminals 3, 4 and 5. The phases may be symbolized as phase A, phase B and phase C. The delta-connected input windings 21–26 receive the three-phase source at the terminals 40, 41 and 42. One phase is applied across the cores 15 and 16, a second phase across the cores 17 and 18 and the third phase across the cores 19 and 20. The cores 15–20 are identical in structure and biased by the direct current control on the control winding associated with the core. It may be noted that the control windings of each leg are of opposite polarity such that the bias on the cores are equal in magnitude but opposite in polarity. The polarity of the two input windings of each leg of the delta are series aiding. Thus, each core of each leg is unsaturated during part of each cycle of input power. One core has a tendency to be unsaturated during the positive half cycle of input signal and the other during the negative half cycle of input signal. It shall be further noted that the output windings of each leg are of opposite polarity such that though they support voltage on opposite half cycles of input signal, the voltages carried by the output windings are of the same polarity. Accordingly, during each half cycle of input signal applied to a given leg, an output signal of double the input frequency appears across the output winding with the magnitude of the output signal dependent on the magnitude of the control current.

Figure 2:
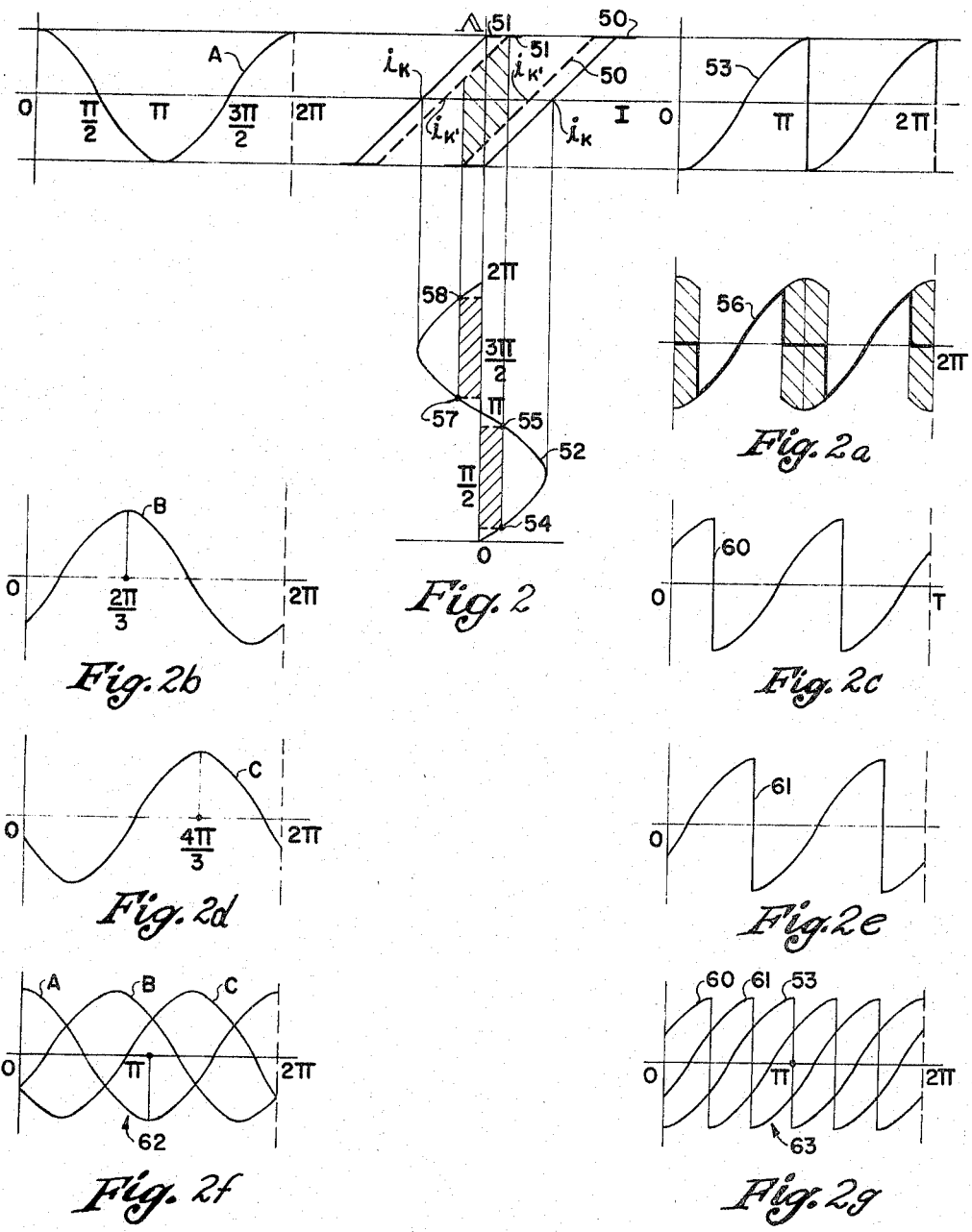

For a more explicit description, refer to FIG. 2. The curves 50 and 51 represent an "ideal" magnetization curve for a given pair of cores with the ordinate $A$ measured in flux linkage and the abscissa $I$ in amperes. All the cores may be of the same material and structure so the curves 50 and 51 represent the magnetization characteristics of all three sets of cores, i.e. 15–16, 17–18 and 19–20. Though these curves are "ideal" in the sense that there is a sharp kneepoint where they go from nonsaturated to the saturated status (with actual cores it is a rounded transition), they serve as a basis for explanation of the theoretical operation of the present invention. It shall be noted that the curve 50 is offset on the positive (+) side of the abscissa and the curve 51 offset on the negative (−) side. The degree of offset is controlled by the current through the control windings. For example, assume phase A appears across the input terminals 3 and 5 and the input windings 21 and 22 of the cores 15 and 16, respectively. The voltage is represented in FIG. 2 by the sinusoidal waveform A and the current by the sinusoidal waveform 52. Assume the value of the control current applied across the input control terminals 13 and 14 is $i_k$ and that the terminal 14 is positive with respect to the terminal 13. Due to the polarity on the control windings 27 and 28, the core 15 is biased in the positive direction and the core 16 in the negative direction. Viewing the curve 52, during the positive half cycle of the input current represented by the area 0–π under the curve 52, the core 15 is unsaturated and the core 16 is saturated. Virtually all the voltage drops across the winding 21 since the impedance of a reactor with a saturated core becomes negligibly small compared to a reactor with an unsaturated core. Because of transformer action, a voltage similar to the input voltage, but of opposite polarity, is induced into the output winding 33. The opposite polarity is due to the opposite polarity of input and output windings 21 and 33, respectively. At $\pi$ the input current, as shown by curve 52, enters the negative half cycle and the core 15 saturates while the core 16 is unsaturated. Consequently, virtually all the voltage now drops across input winding 22 and from the time period $\pi$–$2\pi$, a similar voltage and of the same polarity is induced into the output winding 34, since the input winding 22 and output winding 34 have the same polarity. The cumulative voltage appears as illustrated by the curve 53.

It shall be noted that the frequency of the curve 53 is double the frequency of the input voltage as represented by the curve A. The curve 53 has a complete cycle between 0–$\pi$ of the input voltage and a second cycle between $\pi$–$2\pi$. Furthermore, it shall be noted that the time duration of the unsaturated period of each core depends on the bias. The bias, in turn, is dependent on the magnitude of the control current $I_c$. Assume the value of the control current $I_c$ decreases from $i_k$ to a value $i_k'$. The magnetization curves 50 and 51 are "pulled in" as illustrated by the broken line magnetization curves. Assuming the input current on the input windings remains constant, there is an area illustrated by the cross hatched lines in which the curves 50 and 51 overlap. During the "overlap" period, both cores 15 and 16 are unsaturated and the output windings 33 and 34 each support a voltage. However, since the windings 33 and 34 are of opposite polarity, the voltages carried concurrently by these windings cancel out and the net voltage to the terminals 7 and 8 is zero during the "overlap" period. Viewing the current waveform 52 when the control current is $i_k'$, both cores 50 and 51 are unsaturated until the input reaches the point 54. Thus, during that period the net output voltage is zero. At the point 54, the curve 51 enters the saturation area and the curve 50 remains in the unsaturated area. This condition remains until the current waveform 52 reaches the point 55 at which time both cores 15 and 16 again enter the unsaturated area. During the span from the point 54 to 55, a voltage is supported by the winding 33 as represented by the curve 56. At the point 55, both curves 50 and 51 are in the unsaturation area and the voltages supported by the output windings 33 and 34 cancel each other. Both cores remain unsaturated until the current waveform 52 reaches the point 57. At the point 57, the curve 50 enters the saturated area and the curve 51 remains in the unsaturated area. This condition remains until the current reaches the point 58, at which point both curves again enter the unsaturated area. Thus, the resultant output voltage applied to the stator terminals 7 and 8 when the control current is $i_k'$ is illustrated by the curve 56. The shaded areas adjoining the curve 56 represent the times both cores 15 and 16 are unsaturated. The net value of the output voltage for phase A is that within the unshaded area of the curve 56. It may be noted that the output is considerably less than when the control current was $i_k$.

The curve B of FIG. 2 represents the phase B input voltage between the input terminals 4 and 5 as applied to the input windings 23 and 24 of the cores 17 and 18. The cores being of the same structure as 15 and 16 and the control current being the same for all windings, the input current waveform 52 and the "ideal" magnetization curves 50 and 51 illustrate the conditions for all sets of cores. Accordingly, the output voltage across the windings 35 and 36 and applied to the stator terminals 6 and 7 appears as shown by the curve 60 when the control current is $i_k$. Note that the only difference between the voltage of the curve 60 and that as shown by the curve 53 is that there is a 240 degree phase difference, which is twice the 120 degree phase difference between the input voltages A and B.

Likewise, the curve C of FIG. 2 represents the phase C input voltage between the input terminals 3 and 4 as applied to the input windings 25 and 26 of the cores 19 and 20. The cores being the same as 15, 16, 17 and 18, and the control current being the same for all windings, the output voltage across the windings 37 and 38 and applied to the stator terminals 6 and 8 appears as shown by the curve 61 when the control current is $i_k$. Note that the only difference between the voltage of the curve 53 and 61 is a 120 degree phase shift.

Accordingly, when the control current equals a value $i_k$ wherein each core of each leg remains unsaturated during alternate half cycles of input current, the total three-phase input voltage appears as shown by the graph 62 and the total output voltage as shown by graph 63. The frequency of each phase of voltage is double the input and the phase difference also doubled.

As previously mentioned, as the value of the control current decreased from a value $i_k$, the output voltage also decreases. It may be noticed that when the control current $I_c$ is zero, the magnetization curves 50 and 51 completely overlap and the net output voltage is also zero. Accordingly, the control current varies the output voltage from a minimum value when the control current is zero to a maximum value when each core of each leg is solely unsaturated during entire alternate half cycles of input current.

When the power modulator is used in a speed control system as illustrated in FIG. 1, the control current is dependent on the difference between the desired and actual motor speed. The desired value of control current is preset to a value coinciding with the desired speed. As the desired speed and actual speed deviate an error signal deviates the desired control current. The speed can be controlled from a minimum rotational rate when the control current is zero to a maximum rotational rate when the cores of each leg are solely unsaturated on entire alternate half cycles. Furthermore, as previously mentioned, the speed of the motor is dependent on the frequency of the voltage applied to the stator windings, and since the frequency is doubled, the speed range of the motor is also doubled.

The power modulator 1 of FIG. 1 illustrates both the input and output windings in a delta three-phase connection. In three-phase systems, it is known that delta-connections can be converted to Y-connections and Y-connections to delta-connections. The same is true with the present invention. The input and output windings of the power modulator of the present invention may be arranged in various delta-Y connections, as illustrated in FIGS. 3–5.

Figure 3:
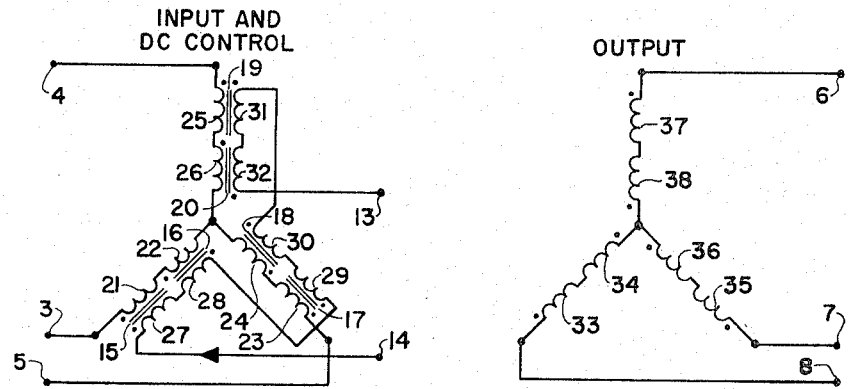
FIG. 3 illustrates a further embodiment of a power modulator circuit according to this invention in which the three-phase connections are Y-connected input windings and output windings.

FIG. 3 illustrates the input, output and control windings of the reactors 15–20 of FIG. 1 with the input windings 21–26 and the output windings 33–38 Y-connected. The control windings 23–28 are connected in series the same as in FIG. 1.

Figure 4:
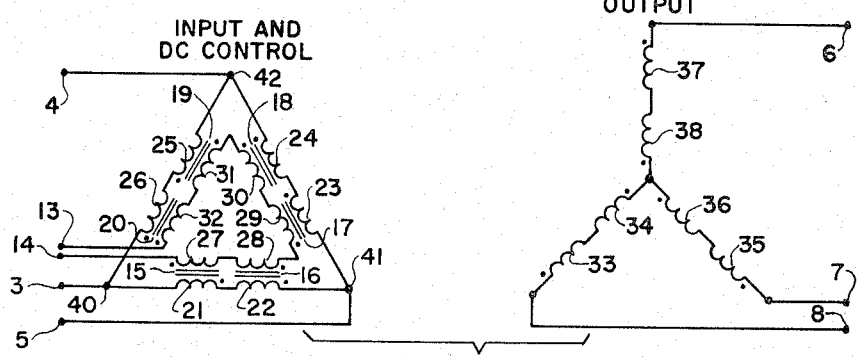
FIG. 4 illustrates a further embodiment of a power modulator circuit according to this invention with delta-connected input windings and Y-connected output windings.

FIG. 4 illustrates the input windings 21–26 in delta-connection and the control windings 27–32 in series as shown in FIG. 1. However, the output windings 33–38 are shown Y-connected.

Figure 5:
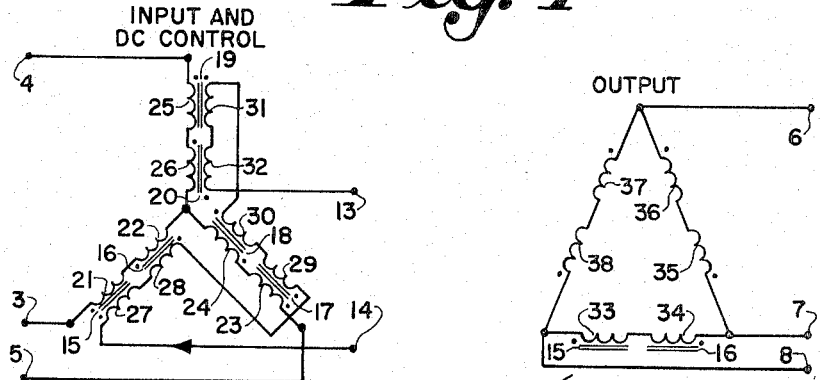
FIG. 5 illustrates a further embodiment of a power modulator circuit according to this invention with Y-connected input windings and delta-connected output windings.

FIG. 5 illustrates the input windings 21–26 in Y-connection and the control windings 27–32 in series as shown in FIG. 3, with the output windings 33–38 in delta-connection as in FIG. 1.

In a frequency doubler the flow of harmonic currents in the control windings must be suppressed as they interfere with the direct current bias signals. Since the control windings are basically the same as the output windings, the alternating current voltage induced into the output windings is also induced into the control windings.

In frequency doublers heretofore available, one common method of overcoming harmonics on the bias windings is by placing large reactors in the control circuit. The reactors impose a high impedance to the alternating current signal. Another method is to take two frequency doublers having voltages 90 degrees apart and feeding them into the input windings. Two voltage signals of twice the frequency of the input and 180 degrees apart are induced in the control windings. Since the control windings are connected in series, the two voltages cancel each other. This method of suppression, however, calls for a complex core and winding arrangement.

The present power modulator suppresses the alternating current signals on the control windings by utilizing the principle that the sum of the voltages on a three-phase system add up to zero in a series circuit. Thus, though the alternating current voltages are induced on the control windings, the net result of the voltages is zero and no alternating current results therefore. The structure requires no additional reactor elements nor complex core and winding arrangement.

Figure 6:
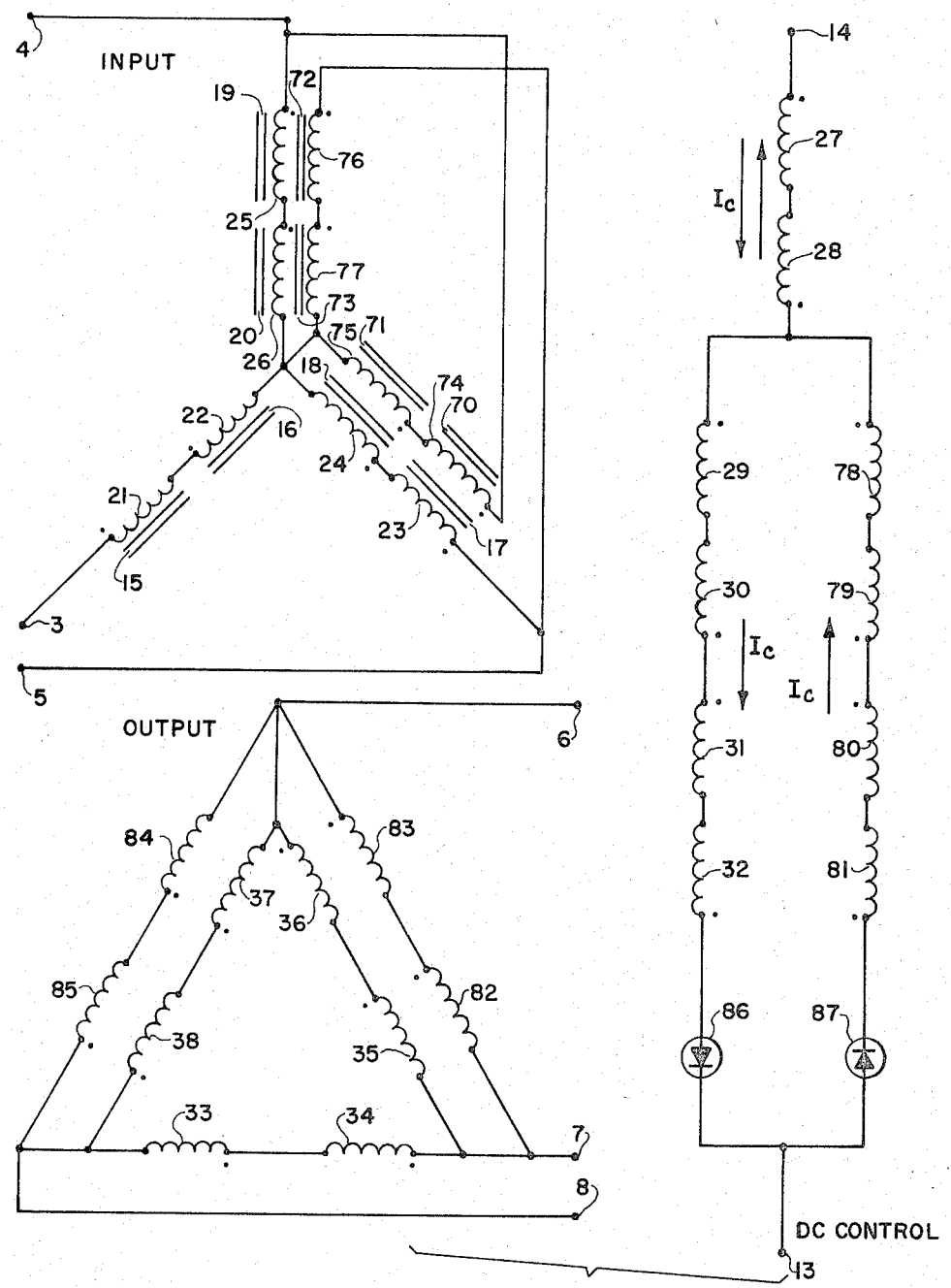
FIG. 6 illustrates a further embodiment of a power modulator circuit according to this invention with the input windings Y-connected, the output windings delta-connected and which circuit may be incorporated in a bidirectional drive.

The power modulators so far described may be utilized in unidirectional speed control systems, i.e. systems wherein the rotation of the motor will always be in one direction. Though unidirectional systems are undoubtedly more commonly used, there are numerous installations requiring speed control for both rotational directions. FIG. 6 illustrates an embodiment of the present modulator for use in the bidirectional speed control systems. The embodiment incorporates a unidirectional power modulator in combination with four additional reactors.

The rotational direction of a polyphase induction motor is dependent on the phase relationship of the stator voltage. A three-phase motor rotates in one direction when the phase order is A, B, C and in the opposite direction when the order of two of the three phases is reversed. For example, if the phase order is A, B, C for one direction, the rotational direction will reverse if the phase relationship is changed to C, B, A; A, C, B; or B, A, C. Accordingly, FIG. 6 illlstrates one embodiment of a power modulator for a bidirectional system in which the phase relationship of two phases are interchanged depending on the desired rotational direction. The phase relationship of the output voltage can be changed by either switching two of the input windings or two of the output windings. The illusrated embodiment of FIG. 6 switches two of the input windings. All of the components of the unidirectional power modulator are incorporated. The reactors 15–20 carry the input windings 21–26 and the control windings 27–32. The input windings 21–26 are Y-connected the same as in FIGS. 3 and 5 so as to accommodate one rotational direction. Two legs of the Y carry additional cores. One leg includes a set of cores 70 and 71 and the other leg a set of cores 72 and 73. Accordingly, the bidirectional power modulator of FIG. 6 has a total of ten saturable reactors, but as will be hereinafter clarified, only six reactors are effective at any one time depending on the rotational direction. The cores 70 and 71 each carry an input windings 74 and 75, respectively. The cores 72 and 73 each carry an input winding 76 and 77, respectively. Each of the cores 70–73 carry a control winding 78–81, respectively, as illustrated by the D.C. control circuit. In FIG. 6, the output windings are shown as delta-connected. The output windings 33–38 are connected the same as in FIGS. 1 and 5 to accommodate one rotational direction. The reactors 70–73 each carry an output winding 82–85, respectively. The output windings 82 and 83 are parallel to the windings 35 and 36 and the windings 84 and 85 are parallel with the windings 37 and 38.

The control windings 27–32 are connected in series with a unidirectional control element 86, shown in FIG. 6 as a rectifier. At the same time the control windings 27, 28 and 78–81 are connected in series with a unidirectional control element 87, shown in FIG. 6 as a rectifier. The rectifiers 86 and 87 are connected in opposing polarity relationship. Thus, assuming that the bidirectional power modulator of FIG. 6 is connected into the system of FIG. 1 when the control current $I_c$ is negative and flows from the terminal 13 to the terminal 14, the current passes through the diode 87, and control windings 27, 28, 78–81. During this time the output windings 33, 34, 82–85 carry a phase voltage of a relationship to cause the motor 2 to rotate in one direction with the speed of rotation being dependent on the magnitude of the current. During the time current passes through the diode 87, the diode 86 blocks current flow so that the current through the control windings 29–32 is zero and accordingly, no voltage appears across the output windings 35–38.

At the point it is desirable to change the rotational direction, the direction of the control current is changed. The control current is reversed so that it flows from the terminal 14 to the terminal 13 through the diode 86 and control windings 27–32. At the same time the diode 87 blocks current flow through the control windings 78–81. Though the output windings 35–38 are parallel to the windings 70–73, and have no effect on the phase relationship, the phase relationship of the input windings 23–26 and 70–73 are interchanged. Accordingly, the output windings 33–38 carry a three-phase voltage of a phase relationship differing from that when the output windings 33, 39, 82–85 carry a voltage. The change in phase relationship causes the motor 2 to rotate in the opposite direction. Accordingly, the bidirectional power modulator as used in a speed control system serves as a stepless continuously operable control over the whole operating range of the motor for either direction of rotation.

Theoretically, the change in phase relationship depending on the direction of control current is believed to be as follows. Basically, as shown in FIG. 6, two terminals of the input windings, primarily the terminals 4 and 5, are interchanged when the control current reverses. Assume phase A appears across input terminals 3 and 5, phase B across input terminals 4 and 5, and phase C across input terminals 3 and 4. Phase A then appears across the input windings 21, 22, 23 and 24 and the input windings 21, 22, 76 and 77. Associated with the input windings 21, 22, 23 and 24 are the control windings 27, 28, 29 and 30, respectively; and the output windings 33, 34, 35 and 36. Associated with the input windings 76 and 77 are the control windings 80 and 81 and output windings 84 and 85. Thus, when the control current is "positive" and flows from the terminal 14 to 13, current flows through the control windings 27, 28 and 29 and 30. An output voltage is carried by the output windings 33, 34, 35 and 36 and a voltage corresponding to phase A of the input voltage appears between the stator winding terminals 6 and 8. At the same time the current is blocked by the diode 87 from flowing through the control windings 80 and 81, and the net voltage across the output windings 84 and 85 resulting from phase A is zero.

At the same time, phase B appears across the input windings 23, 24, 25, 26 and also across the input windings 74, 75, 76 and 77. Associated with the input windings 23, 24, 25 and 26 are the control windings 29, 30, 31 and 32, respectively; and the output windings 35, 36, 37 and 38. Thus, when the control current flows from the terminal 14 to 13, output voltage is carried by the output windings 29, 30, 31 and 32, and a voltage corresponding to phase B of the input voltage appears between the stator winding terminals 7 and 8. Since the current is blocked by the diode 87 from flowing through the control windings 78, 79, 80 and 81 associated with the input windings 74, 75, 76 and 77, the net voltage across the output windings 82, 83, 84 and 85 resulting from phase B is zero.

Phase C appears across the input windings 21, 22, 25, 26 and 21, 22, 74 and 75. Accordingly, when the control current is positive, the output windings 33, 34, 37 and 38 carry a voltage corresponding to phase C of the input voltage. This voltage appears between the stator terminals 6 and 7. Accordingly, when the control current is "positive" and passes from the input terminal 14 to the terminal 13, the relationship of the output voltage is such: phase A appears between stator terminals 6 and 8, phase B between stator terminals 7 and 8, and phase C between stator terminals 6 and 7.

Upon a change in direction of the flow of control current, the rectifier 86 blocks current through the control windings 29, 30, 31 and 32 and permits flow through the control windings 78, 79, 80 and 81. The net phase A output voltage across the output windings 35 and 36 is zero and an output voltage corresponding to phase A appears across the stator terminals 6 and 7 rather than 6 and 8 as when the control was "positive." At the same time control current flows through the control windings 78, 79, 80 and 81 and a net phase B output voltage appears across the output windings 82, 83, 84 and 85 and the stator terminals 7 and 8 which are the same as when the control current is positive. As aforementioned, the phase C voltage appears between the input windings 21, 22, 25, 26 and 21, 22, 74, 75. However, since the rectifier 86 blocks control current and the rectifier 87 accepts current, the reactors 70 and 71 are biased, a net phase C output voltage appears across the output windings 33, 34, 82 and 83 or terminals 6 and 8 rather than 6 and 7 as when the control current is positive. Consequently, when the control current is negative and passes from the input terminal 13 to the input terminal 14, phase A appears between the stator terminals 6 and 7, phase B between the stator terminals 7 and 8, and phase C between the stator terminals 6 and 8.

Though FIG. 6 illustrates a bidirectional power modulator with the input windings Y-connected and the output windings delta-connected, the type of connection is not critical. As with the unidirectional power modulator, the input and output windings may be arranged in various Y-delta combinations.

I claim:

1. A magnetic power modulator for converting a three-phase source of alternating current power having a predetermined frequency to a three-phase source of alternating current power having a frequency double the predetermined frequency, said power modulator comprising:
   a saturable reactor consisting of six saturable magnetic core means, each core carrying an input winding, an output winding and a control winding, said input windings connected in a Y-delta three-phase arrangement, said output windings connected in a Y-delta three-phase arrangement and said control windings connected in series;
   a first terminal means for receiving a three-phase electrical power source across said input windings;
   a second terminal means for receiving a three-phase electrical load across said output windings; and
   a third terminal means for connecting a direct current source to said control windings, whereby said direct current magnetically bias the cores associated with each control winding.

2. A magnetic power modulator for converting a three-phase source of alternating current power having a predetermined frequency to a three-phase source of alternating current power having a frequency double the predetermined frequency, said power modulator comprising:
   a saturable reactor consisting of six saturable magnetic core means, each core carrying an input winding, and output winding and a control winding, said input windings connected in a Y-delta three-phase arrangement with two windings connected in series aiding for each leg of the Y-delta arrangement, said output windings connected in a Y-delta three-phase arrangement with two windings connected in series opposing for each leg of the Y-delta arrangement and said control windings connected in series with the two control windings of each leg being of opposite polarity;
   a first terminal means for receiving a three-phase electrical power source across said input windings;
   a second terminal means for receiving a three-phase electrical load across said output windings; and
   a third terminal means for connecting a direct current source to said control windings, whereby said direct current source magnetically bias the cores associated with each control winding.

3. A magnetic power modulator in accordance with claim 2 in which the input windings are connected in delta three-phase arrangement with two windings connected in series aiding for each leg of the delta, said output windings being connected in delta three-phase arrangement with two windings connected in series opposing for each leg of the delta.

4. A magnetic power modulator in accordance with claim 2 in which the input windings are connected in Y three-phase arrangement with two windings connected in series aiding for each leg of the Y, said output windings being connected in delta three-phase arrangement with two windings connected in series opposing for each leg of the delta.

5. A magnetic power modulator in accordance with claim 2 in which the input windings are connected in Y three-phase arrangement with two windings connected in series aiding for each leg of the Y, said output windings being connected in Y three-phase arrangement with two windings connected in series opposing for each leg of the Y.

6. A magnetic power modulator in accordance with claim 2 in which the input windings are connected in delta three-phase arrangement with two windings connected in series aiding for each leg of the delta, said output windings being connected in Y three-phase arrangement with two windings connected in series opposing for each leg of the Y.

7. A magnetic power modulator for connecting a three-phase source of alternating current power having a predetermined frequency ot a three-phase source of alternating current power having a frequency double the predetermined frequency, said power modulator comprising:
   at least ten saturable magnetic cores, each core carrying an input winding, an output winding and a control winding, said magnetic cores divided into a first, a second, a third, a fourth and a fifth pair of two cores each with the input windings of each pair connected in series aiding, the output windings in series opposing and the control windings in series opposing;
   a first input circuit including a Y-delta three-phase arrangement of the input windings of the first, the second and the third pairs of cores;
   a first output circuit including Y-delta three-phase arrangements of the output windings of the first, the second and the third pairs of cores;
   a first control circuit including a series connection of the control windings of the first, the second and the third pairs of cores;
   a first unidirectional control element connected in series with said first control circuit, whereby a direct current signal can pass through said first control circuit in one direction only;
   a second input circuit including a Y-delta three-phase arrangement of the output windings of the first, the fourth and the fifth pairs of cores;
   a second output circuit including a Y-delta three-phase arrangement of the output windings of the first, the fourth and the fifth pairs of cores;
   a second control circuit including a series connection of the control windings of the first, the fourth and the fifth pairs of cores;
   a second unidirectional control element connected in series with said second control circuit such that a direct current signal can pass through said second control circuit in a direction opposite to that of the first control circuit;
   a first terminal means for receiving a three-phase electrical power source across said first and said second input circuit;

a second terminal means for receiving a three-phase electrical load across said first and said second output circuits; and a third terminal means for connecting a direct current source to said first and said second control circuits, said direct current source magnetically biasing the cores associated with each control winding.

References Cited

UNITED STATES PATENTS

| | | | |
|---|---|---|---|
| 3,229,192 | 1/1966 | Bundy | 321—68 |
| 2,849,674 | 8/1958 | Biringer | 321—68 |
| 2,882,478 | 4/1959 | Robart et al. | 323—48 X |
| 3,127,547 | 3/1964 | Biringer et al. | 318—229 |

JOHN F. COUCH, *Primary Examiner.*

G. GOLDBERG, *Assistant Examiner.*